(12) United States Patent
Shimoyama et al.

(10) Patent No.: US 9,457,794 B2
(45) Date of Patent: Oct. 4, 2016

(54) HYBRID VEHICLE CONTROL DEVICE

(71) Applicant: NISSAN MOTOR CO., LTD., Yokohama-shi, Kanagawa (JP)

(72) Inventors: Hiroki Shimoyama, Ebina (JP); Hiroki Matsui, Ebina (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 14/653,556

(22) PCT Filed: Nov. 15, 2013

(86) PCT No.: PCT/JP2013/080859
§ 371 (c)(1),
(2) Date: Jun. 18, 2015

(87) PCT Pub. No.: WO2014/103551
PCT Pub. Date: Jul. 3, 2014

(65) Prior Publication Data
US 2015/0344018 A1 Dec. 3, 2015

(30) Foreign Application Priority Data

Dec. 26, 2012 (JP) ................................ 2012-281901

(51) Int. Cl.
*B60L 9/00* (2006.01)
*B60W 20/00* (2016.01)
*B60W 10/06* (2006.01)
(Continued)

(52) U.S. Cl.
CPC ............ *B60W 20/10* (2013.01); *B60K 6/48* (2013.01); *B60K 6/547* (2013.01); *B60L 11/14* (2013.01); *B60L 11/1861* (2013.01); *B60L 15/20* (2013.01); *B60W 10/02* (2013.01); *B60W 10/06* (2013.01); *B60W 10/08* (2013.01); *B60W 20/40* (2013.01);
(Continued)

(58) Field of Classification Search
CPC .... B60W 20/10; B60W 10/02; B60W 10/06; B60W 10/08; B60W 20/40; B60K 6/48; B60K 6/547; B60L 11/14; B60L 11/1861; B60L 15/20; F02N 11/08
See application file for complete search history.

(56) References Cited

U.S. PATENT DOCUMENTS

| 8,996,217 B2 * | 3/2015 | Tanishima | B60L 11/123 180/65.245 |
| 2007/0080005 A1 * | 4/2007 | Joe | B60K 6/48 180/65.245 |
| 2011/0021312 A1 * | 1/2011 | Fukitani | B60K 6/48 477/5 |

FOREIGN PATENT DOCUMENTS

JP 2010-083417 A 4/2010

*Primary Examiner* — Calvin Cheung
(74) *Attorney, Agent, or Firm* — Foley & Lardner LLP

(57) ABSTRACT

The hybrid vehicle control device includes: a transfer-torque-capacity command-value correcting section configured to execute a correcting processing such that a transfer-torque-capacity command value for a second clutch is corrected at the time of execution of a minute slip processing; an engine start control section configured to execute an engine start control such that an engine is started by slipping the second clutch and increasing drive torque of a motor/generator; a start-time slip control section configured to execute a slip-in processing such that a transfer torque capacity of the second clutch is controlled to a predetermined slip-in torque when the second clutch starts to slip by the engine start control; and a correction limiting section configured to execute a correction limiting processing such that a correction amount is limited if a torque reduction given by the slip-in processing interferes with a torque reduction given by the correcting processing.

6 Claims, 15 Drawing Sheets

(51) Int. Cl.

| | | |
|---|---|---|
| *B60K 6/48* | (2007.10) | |
| *B60K 6/547* | (2007.10) | |
| *B60L 11/14* | (2006.01) | |
| *B60L 15/20* | (2006.01) | |
| *B60W 10/02* | (2006.01) | |
| *B60W 10/08* | (2006.01) | |
| *B60L 11/18* | (2006.01) | |
| *F02N 11/08* | (2006.01) | |
| *F02D 29/02* | (2006.01) | |

(52) U.S. Cl.
CPC ............ *F02N 11/08* (2013.01); *B60L 2210/40* (2013.01); *B60L 2220/14* (2013.01); *B60L 2240/423* (2013.01); *B60L 2240/486* (2013.01); *B60L 2240/507* (2013.01); *B60L 2270/145* (2013.01); *B60W 2510/0241* (2013.01); *B60W 2510/0275* (2013.01); *B60W 2710/025* (2013.01); *B60W 2710/0666* (2013.01); *B60W 2710/083* (2013.01); *B60Y 2300/429* (2013.01); *F02D 29/02* (2013.01); *Y02T 10/6221* (2013.01); *Y02T 10/645* (2013.01); *Y02T 10/70* (2013.01); *Y02T 10/705* (2013.01); *Y02T 10/7005* (2013.01); *Y02T 10/7044* (2013.01); *Y02T 10/7077* (2013.01); *Y02T 10/7241* (2013.01); *Y02T 10/7275* (2013.01); *Y10S 903/93* (2013.01)

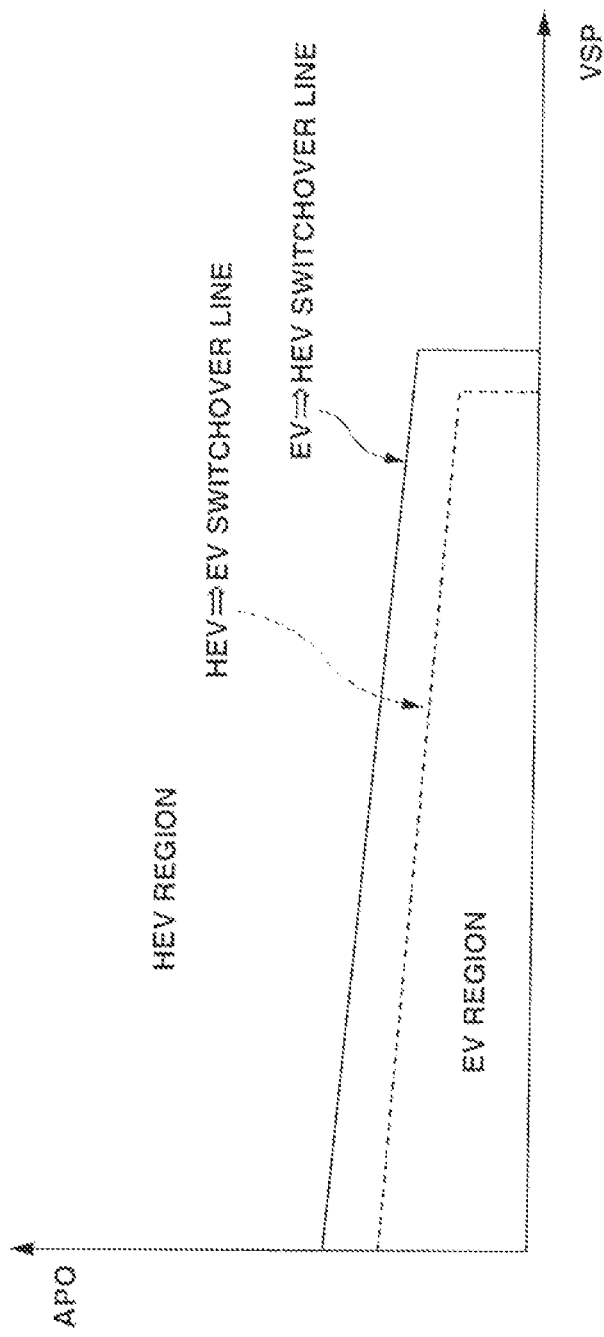

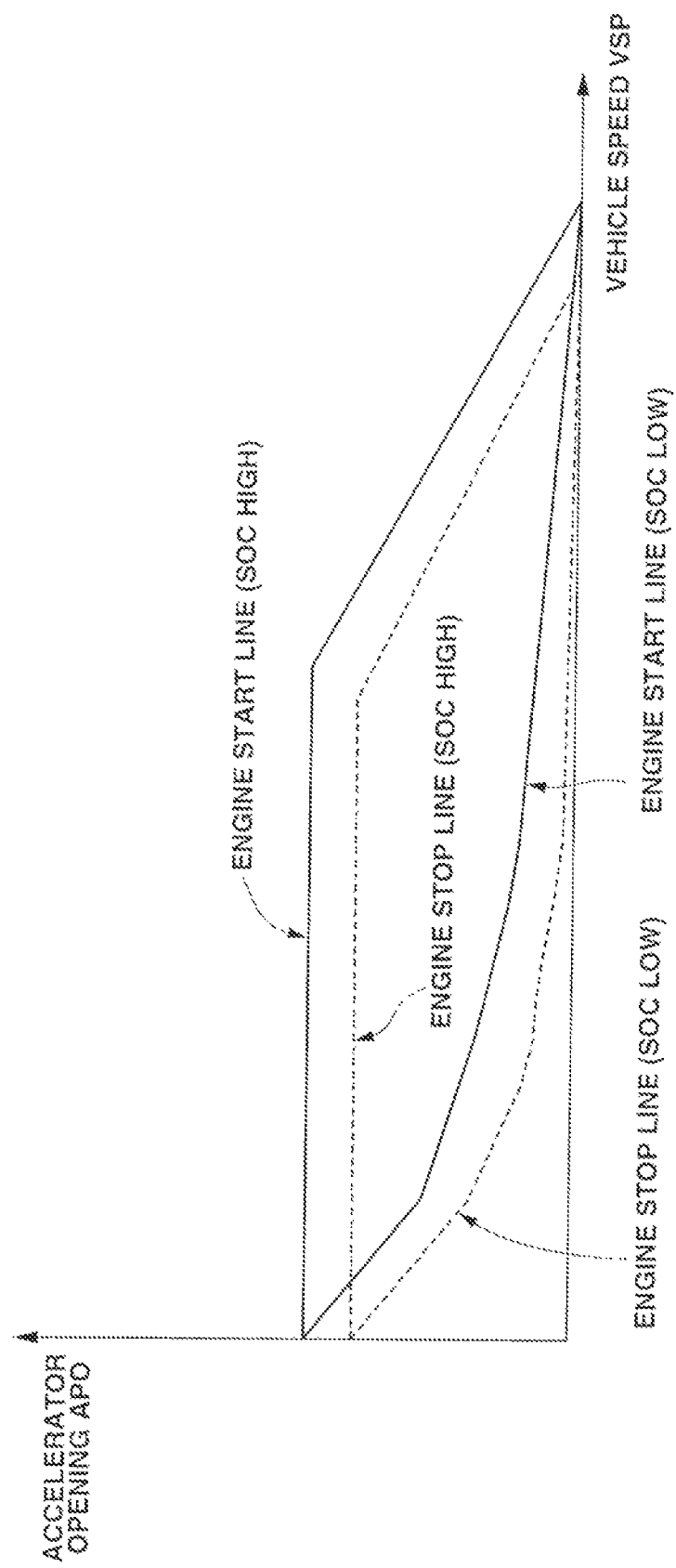

HYBRID VEHICLE CONTROL DEVICE

TECHNICAL FIELD

The present invention relates to a hybrid vehicle control device, and more particularly to a slip control for a drive-wheel-side clutch interposed between a drive source and a drive wheel.

BACKGROUND ART

Conventionally, a hybrid vehicle which includes a second clutch as a drive-wheel-side clutch interposed between a drive source and a drive wheel in a power train system is known (for example, see Patent literature 1).

In this technique, when an engine is started, a rotation of a motor is transmitted to the engine while slipping a first clutch. Also at this time, a slip-in of the second clutch inhibits torque variation caused due to the start of the engine, from being transmitted toward the drive wheel.

Moreover, in this conventional technique, if a transfer torque capacity of the second clutch which is obtained from a motor torque value has a difference from a target value in an EV mode where only the motor is driven, a transfer-torque-capacity command value for the second clutch is corrected according to the difference.

CITATION LIST

Patent Literature

Patent Literature 1: Japanese Patent No. 2010-83417

SUMMARY OF THE INVENTION

Problem to be Solved

However, in the conventional technique, when the slip-in is produced by an engine start control in a state where the transfer torque capacity of the second clutch has been corrected in a torque-reducing side in the EV mode, the transfer torque capacity of the second clutch is further reduced by a slip-in torque from the corrected state.

In such a case, there is a problem that a slip amount of the second clutch (departure clutch) becomes excessive at the time of engine start, so that an acceleration of the vehicle is lowered.

It is therefore an object of the present invention to provide a hybrid vehicle control device capable of suppressing the lowering of vehicle acceleration at the time of slip control of the departure clutch.

Solution to Problem

To attain the above object, a hybrid vehicle control device according to the present invention comprises:
  a transfer-torque-capacity command-value correcting section configured to execute a correcting processing such that a transfer-torque-capacity command value for the drive-wheel-side clutch is corrected according to a difference between a transfer torque capacity of the drive-wheel-side clutch and a target value of a minute slip processing if the difference exists at the time of execution of the minute slip processing in the EV mode;
  a start-time slip control section configured to execute a slip-in processing such that the transfer torque capacity of the drive-wheel-side clutch is reduced to a slip-in torque when an engine start control is started, the slip-in torque being predetermined in order to slip the drive-wheel-side clutch; and
  a correction limiting section configured to execute a correction limiting processing such that a reduction amount given by the correcting processing is limited under a condition that a reduction of the slip-in torque given by the slip-in processing occurs with a reduction of correction amount given by the correcting processing.

Effects of Invention

According to the present invention, if a slip-in control for the departure clutch is executed with the transfer torque capacity of the departure clutch corrected in a torque-reducing direction by the transfer-torque-capacity command-value correcting section, the correction limiting section limits the reduction amount given by the correcting processing.

Accordingly, in the case that the slip-in processing of the departure clutch is executed, a variability of the slip amount of the departure clutch which is caused depending on execution or non-execution of the correcting processing is suppressed at the time of slip-in. Therefore, the slip amount of the departure clutch at the time of slip-in can be inhibited from becoming excessive so as to lower the vehicle acceleration.

BRIEF EXPLANATION OF DRAWINGS

FIG. 3 A view showing an EV-HEV selection map which is used when the integrated controller conducts a mode-selection process.

FIG. 5 A region-line chart showing an electric running mode (EV) region and a hybrid running mode (HEV) region in the drive-torque control device for hybrid vehicle in the first embodiment.

DETAILED DESCRIPTION OF INVENTION

Figure 1:
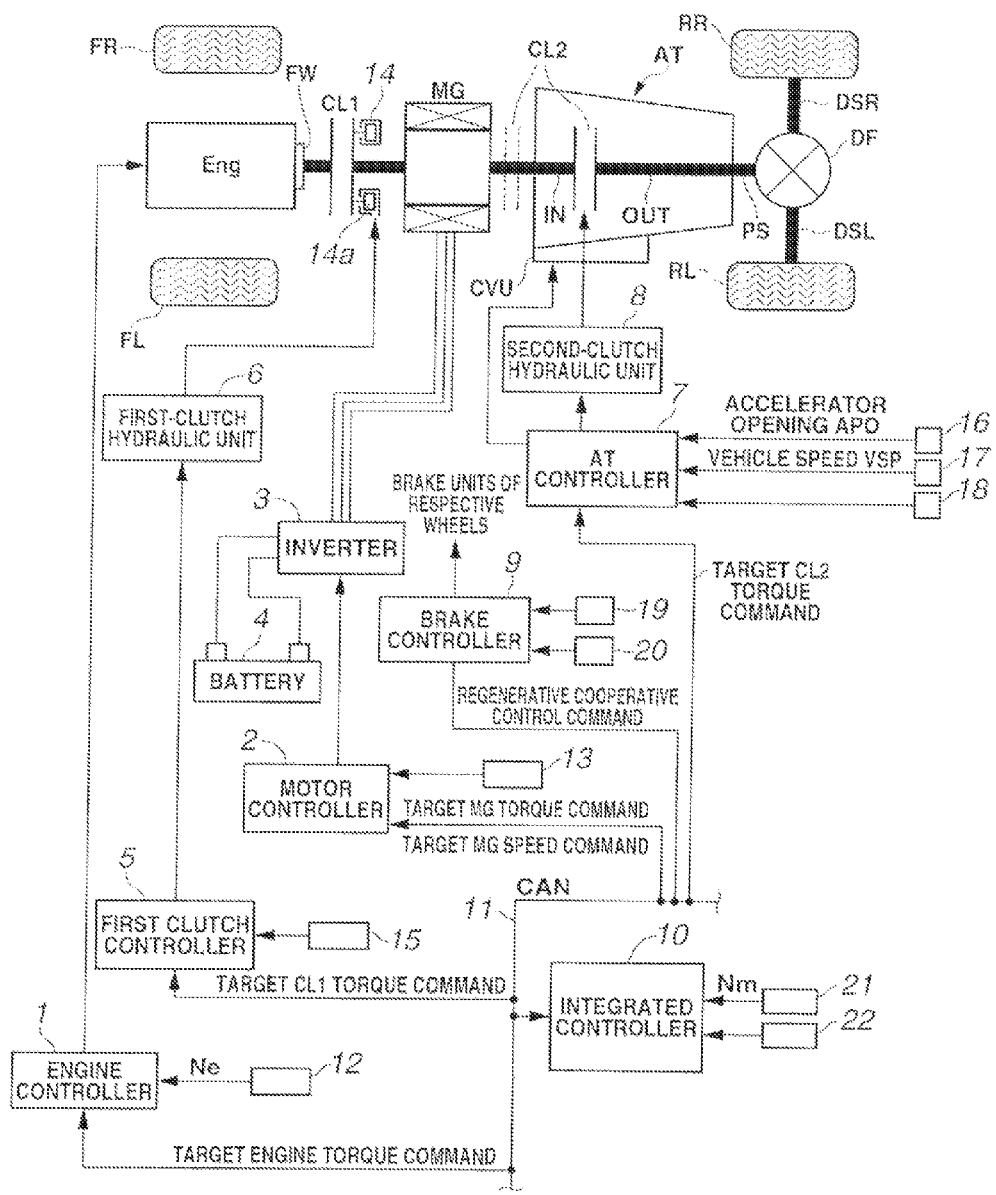
FIG. 1 A system overall view showing a rear-wheel-drive hybrid vehicle to which a drive-torque control device for hybrid vehicle in a first embodiment is applied.

Hereinafter, the preferred mode for carrying out a hybrid vehicle control device according to the present invention will be explained based on embodiments shown in the drawings.

First Embodiment

At first, a configuration of the hybrid vehicle control device in a first embodiment will be explained. For convenience sake, the configuration of the hybrid vehicle control device in the first embodiment is divided into [power-train configuration], [control-system configuration], [integrated-controller configuration], [integrated-control-arithmetic-processing configuration], [integrated-control-arithmetic-processing configuration], [engine-start-control-section configuration], [EV-mode-slip-control-section configuration] and [correction-limiting-section configuration].

[Power-Train Configuration]

A power-train configuration of a hybrid vehicle in the first embodiment will now be explained. FIG. 1 is a system overall view showing the rear-wheel-drive hybrid vehicle to which a drive-torque control device for hybrid vehicle in the first embodiment is applied.

As shown in FIG. 1, a drive system of the hybrid vehicle in the first embodiment includes an engine Eng, a flywheel FW, a first clutch (starting clutch) CL1, a motor/generator MG, a second clutch (drive-wheel-side clutch) CL2, an automatic transmission AT, a propeller shaft PS, a differential DF, a left drive shaft DSL, a right drive shaft DSR, a left rear wheel (drive wheel) RL, a right rear wheel (drive wheel) RR, a left front wheel FL, and a right front wheel FR.

The engine Eng is a gasoline engine, a diesel engine or the like. An engine start control, an engine stop control, and a valve opening control for a throttle valve are performed based on engine control commands derived from an engine controller 1. The flywheel FW is attached to an output shaft of the engine Eng.

The first clutch CL1 is provided between the engine Eng and the motor/generator MG. Engagement and disengagement (including a partially-engaged state) of the first clutch CL1 are controlled by a first-clutch control hydraulic pressure which is produced by a first-clutch hydraulic unit 6 on the basis of a first-clutch control command derived from a first clutch controller 5. For example, a dry-type single-disc clutch whose engagement and disengagement are controlled by a hydraulic actuator 14 that includes a piston 14a is used as the first clutch CL1.

The motor/generator MG is a synchronous motor/generator. A permanent magnet is buried in a rotor of the motor/generator MG, and a stator coil is wound on a stator of the motor/generator MG. The motor/generator MG is controlled by three-phase AC (alternating current) produced by an inverter 3 on the basis of a control command derived from a motor controller 2. The motor/generator MG operates as an electric motor that drivingly rotates by receiving electric power supplied from a battery 4 (hereinafter, this state is called "power running"). Moreover, the motor/generator MG operates as an electric generator that produces electromotive force between both ends of the stator coil so that the battery 4 is charged (hereinafter, this operating state is called "regenerative running") when the rotor of the motor/generator MG receives rotational energy from the engine Eng or the drive wheels. The rotor of the motor/generator MG is connected through a damper with a transmission input shaft of the automatic transmission AT.

The second clutch CL2 is interposed between the motor/generator MG and the left and right rear wheels RL and RR. Engagement and disengagement of the second clutch CL2 (including a slipping engaged state and a slipping disengaged state) are controlled by a control hydraulic pressure produced by a second-clutch hydraulic unit 8 on the basis of a second-clutch control command derived from an AT controller 7. For example, a wet-type multiple-disc clutch or a wet-type multiple-disc brake which can continuously control oil flow rate (oil flow quantity) and hydraulic pressure by use of a proportional solenoid is used as the second clutch CL2.

The first-clutch hydraulic unit 6 and the second-clutch hydraulic unit 8 are placed in an AT hydraulic control valve unit CVU which is annexed to the automatic transmission AT.

The automatic transmission AT is a step transmission configured to automatically switch among stepped speed ratios (e.g. five forward speeds and one reverse speed) in accordance with a vehicle speed, an accelerator opening and the like. The second clutch CL2 is not provided additionally as a special-purpose clutch, but is one selected from a plurality of friction engagement elements of the automatic transmission AT which are engaged for respective speed ratios. That is, as the second clutch CL2, a clutch or brake which exists on torque transfer path is suitably selected from the plurality of friction engagement elements. However, a special-purpose clutch may be used as the second clutch CL2 without using the friction engagement element of the automatic transmission AT. In this case, as shown by an alternate-long-and-two-short dashes line in Figure, the special-purpose clutch is provided between the motor/generator MG and the automatic transmission AT. Alternatively, in this case, the special-purpose clutch may be provided between the automatic transmission AT and the drive wheels (left and right rear wheels RL and RR).

An output shaft of the automatic transmission AT is connected to the left and right rear wheels RL and RR through the propeller shaft PS, the differential DF, the left drive shaft DSL and the right drive shaft DSR.

[Control-System Configuration]

Next, a control system of the hybrid vehicle will now be explained.

As shown in FIG. 1, the control system of the hybrid vehicle in the first embodiment includes the engine controller 1, the motor controller 2, the inverter 3, the battery 4, the first clutch controller 5, the first-clutch hydraulic unit 6, the AT controller 7, the second-clutch hydraulic unit 8, a brake controller 9, and an integrated controller 10. The engine controller 1, the motor controller 2, the first clutch controller 5, the AT controller 7, the brake controller 9 and the integrated controller 10 are connected with one another via a CAN communication line 11 capable of information interchange.

The engine controller 1 receives an engine speed information derived from an engine speed sensor 12, a target engine torque command derived from the integrated controller 10, and the other needed information. Then, the engine controller 1 outputs a command to control an engine operating point (Ne, Te), to a throttle valve actuator or the like of the engine Eng.

The motor controller 2 receives an information derived from a resolver 13 for sensing a rotor rotational position of the motor/generator MG, a target MG torque command and a target MG rotational-speed command derived from the integrated controller 10, and the other needed information. Then, the motor controller 2 outputs a command to control a motor operating point (Nm, Tm) of the motor/generator MG, to the inverter 3. The motor controller 2 monitors a battery SOC which indicates a state of charge (charged capacity) of the battery 4. The information of the battery SOC is used as a control information for the motor/generator MG, and is supplied via the CAN communication line 11 to the integrated controller 10.

The first clutch controller 5 receives a sensor information derived from a first clutch stroke sensor 15 for sensing a stroke position of the piston 14a of the hydraulic actuator 14, a target CL1 torque command derived from the integrated controller 10, and the other needed information. Then, the first clutch controller 5 outputs a command to control the engagement/disengagement of the first clutch CL1, to the first-clutch hydraulic unit 6 installed in the AT hydraulic control valve unit CVU.

The AT controller 7 receives information from an accelerator opening sensor 16, a vehicle speed sensor 17, and the other sensors or the like 18 (such as a transmission input-rotational-speed sensor and an inhibitor switch). When the vehicle runs with D-range (Drive-position) selected, the AT controller 7 retrieves an optimum speed ratio according to an existing position of a driving point on a shift map. This driving point is determined by the accelerator opening APO and the vehicle speed VSP. Then, the AT controller 7 outputs a control command to attain the retrieved speed ratio, to the AT hydraulic control valve unit CVU. Moreover, in addition to the above-mentioned automatic shift control, the AT controller 7 performs a second clutch control when a target CL2 torque command is inputted from the integrated controller 10 to the AT controller 7. In the second clutch control, the AT controller 7 outputs a command to control the engagement/disengagement of the second clutch CL2, to the second-clutch hydraulic unit 8 installed in the AT hydraulic control valve unit CVU.

Figure 8:
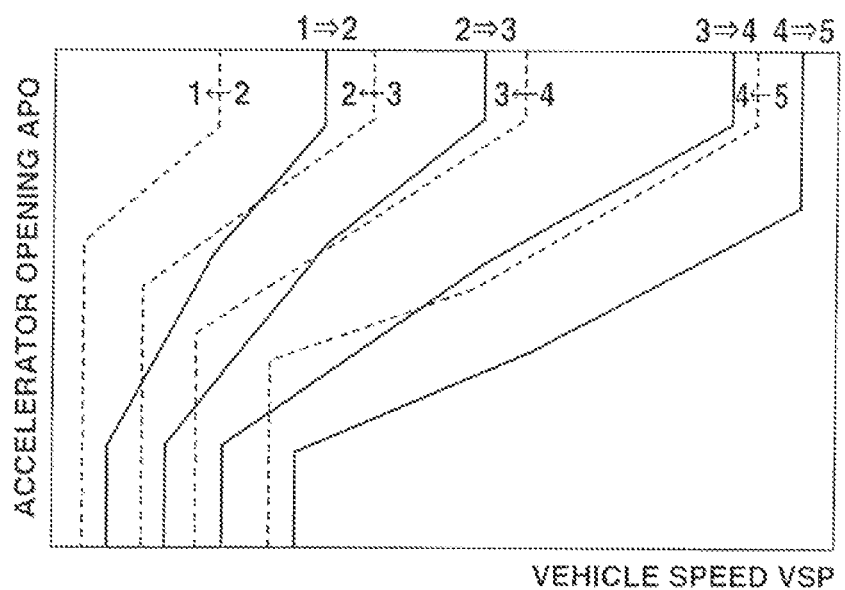
FIG. 8 A shift characteristic-line chart which is used when a speed ratio is set by an AT controller that performs a shift control for an automatic transmission applied to the drive-torque control device for hybrid vehicle in the first embodiment.

It is noted that the shift map is a map in which up-shift lines and down-shift lines are drawn according to the accelerator opening APO and the vehicle speed VSP. One example of the shift map is shown in FIG. 8.

The brake controller 9 receives a sensor information derived from a brake stroke sensor 20 and wheel speed sensors 19 for sensing respective speed values of the four wheels, a regenerative cooperative control command derived from the integrated controller 10, and the other needed information. For example, in the case that a regenerative braking force falls short of (i.e. is insufficient relative to) a braking force required by a brake stroke BS at the time of braking by way of brake-pedal depression, the brake controller 9 carries out a regenerative cooperative brake control to compensate for this shortfall with a mechanical braking force (fluid braking force or motor braking force).

[Integrated-Controller Configuration]

The integrated controller 10 manages a consumption energy of whole the vehicle, and functions to cause the vehicle to run at maximum efficiency. The integrated controller 10 receives a needed information derived from a motor rotational-speed sensor 21 for sensing a motor rotational speed Nmot and the other sensors/switches or the like 22, and an information transferred via the CAM communication line 11. Then, the integrated controller 10 outputs the target engine torque command to the engine controller 1, outputs the target MG torque command and the target MG rotational-speed command to the motor controller 2, outputs the target CL1 torque command to the first clutch controller 5, outputs the target CL2 torque command to the AT controller 7, and outputs the regenerative cooperative control command to the brake controller 9.

Figure 2:
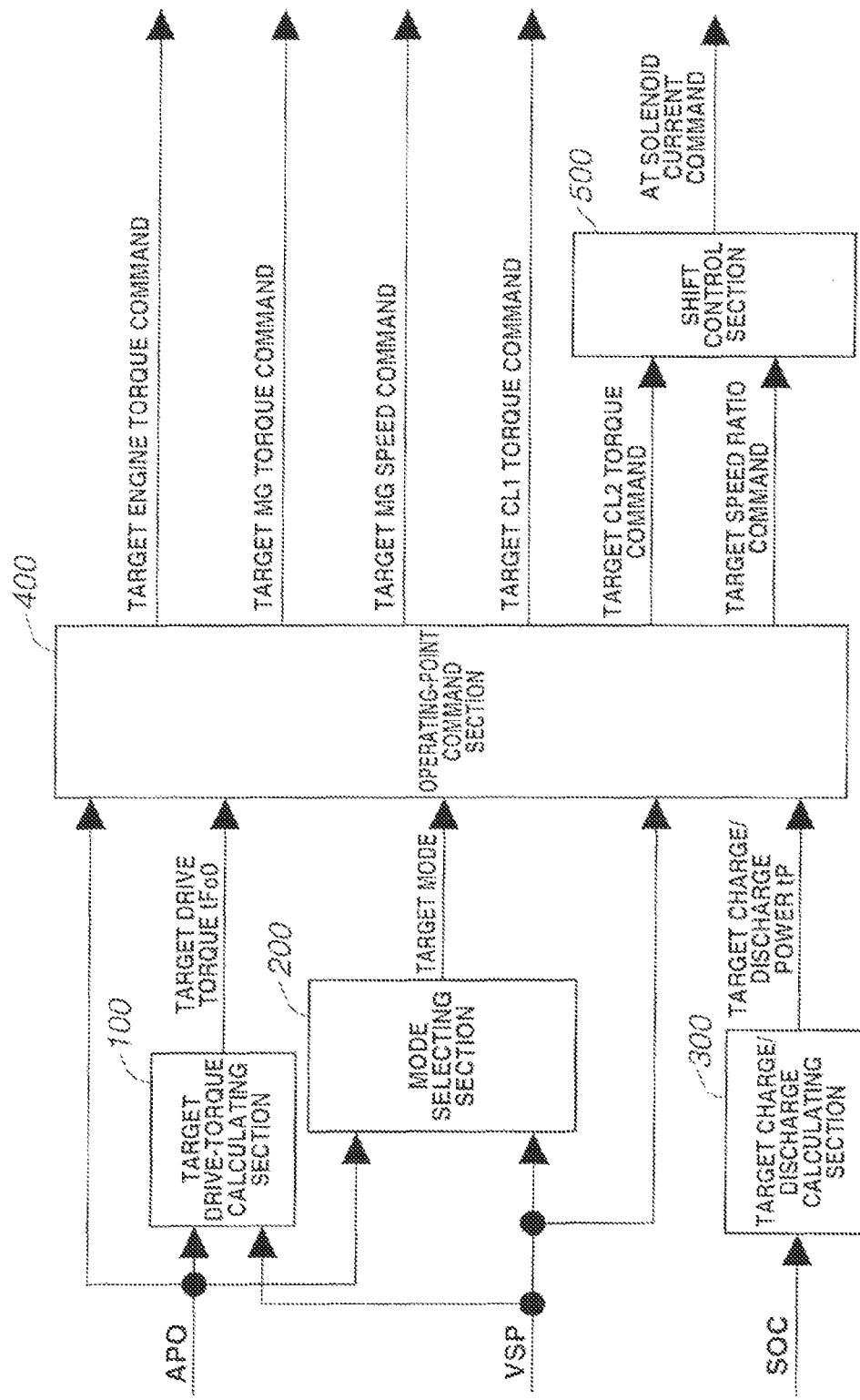
FIG. 2 A control block diagram showing computing processing which is executed by an integrated controller of the hybrid vehicle to which the drive-torque control device for hybrid vehicle in the first embodiment is applied.

FIG. 2 is a control block diagram showing computing processing which is executed by the integrated controller 10 of the hybrid vehicle to which the hybrid vehicle control device in the first embodiment is applied. FIG. 3 is a view showing an EV-HEV selection map which is used when the integrated controller 10 of the hybrid vehicle conducts a mode-selection process. The computing processing which is executed by the integrated controller 10 in the first embodiment will now be explained referring to FIGS. 2 and 3.

As shown in FIG. 2, the integrated controller 10 includes a target drive-torque calculating section 100, a mode selecting section 200, a target charge/discharge calculating section 300, and an operating-point command section 400.

Figure 4A:
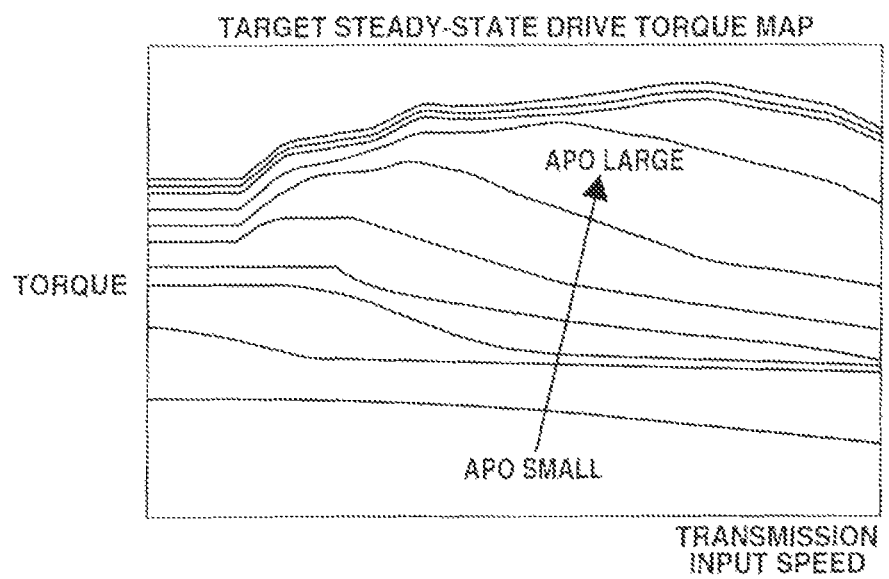
FIG. 4A A drive-force characteristic-line map showing a target steady-state drive torque characteristic which is used when a target drive-torque calculating section calculates a target drive torque in the drive-torque control device for hybrid vehicle in the first embodiment.
Figure 4B:
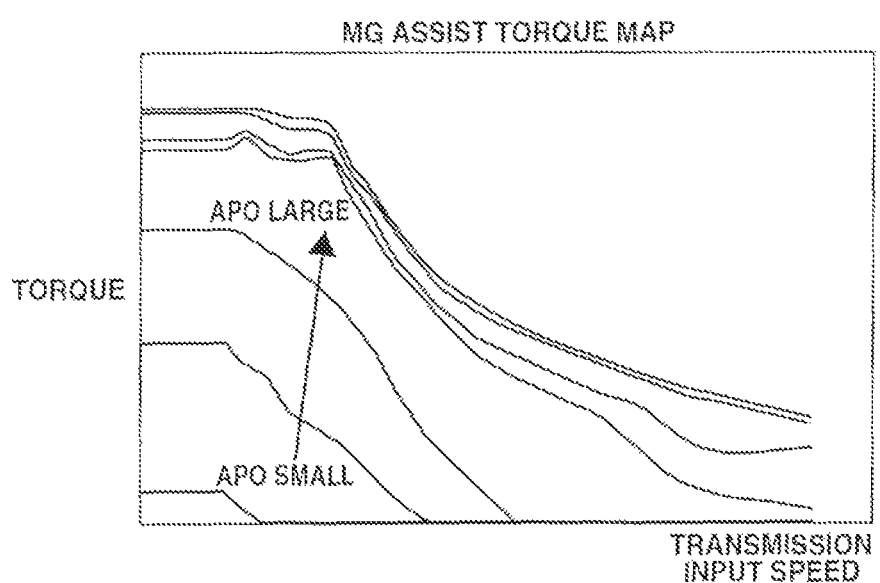
FIG. 4B An assist torque map showing a MG assist torque characteristic which is used when the target drive-torque calculating section calculates an assist torque of motor/generator in the drive-torque control device for hybrid vehicle in the first embodiment.

The target drive-torque calculating section 100 calculates a target steady-state drive torque and a MG assist torque from a transmission input rotational-speed according to the accelerator opening APO and the vehicle speed VSP, by using a target steady-state drive torque map as shown in FIG. 4A and a MG assist torque map as shown in FIG. 4B.

The mode selecting section 200 selects "EV running mode" or "HEV running mode" as a target running mode, by using an engine start-stop line map as shown in FIG. 5. The engine start-stop line map is set according to the vehicle speed and the accelerator opening APO. If is noted that an engine start line and an engine stop line of the engine start-stop line map are more lowered in a direction that reduces the accelerator opening as the battery SOC becomes smaller.

Figure 6:
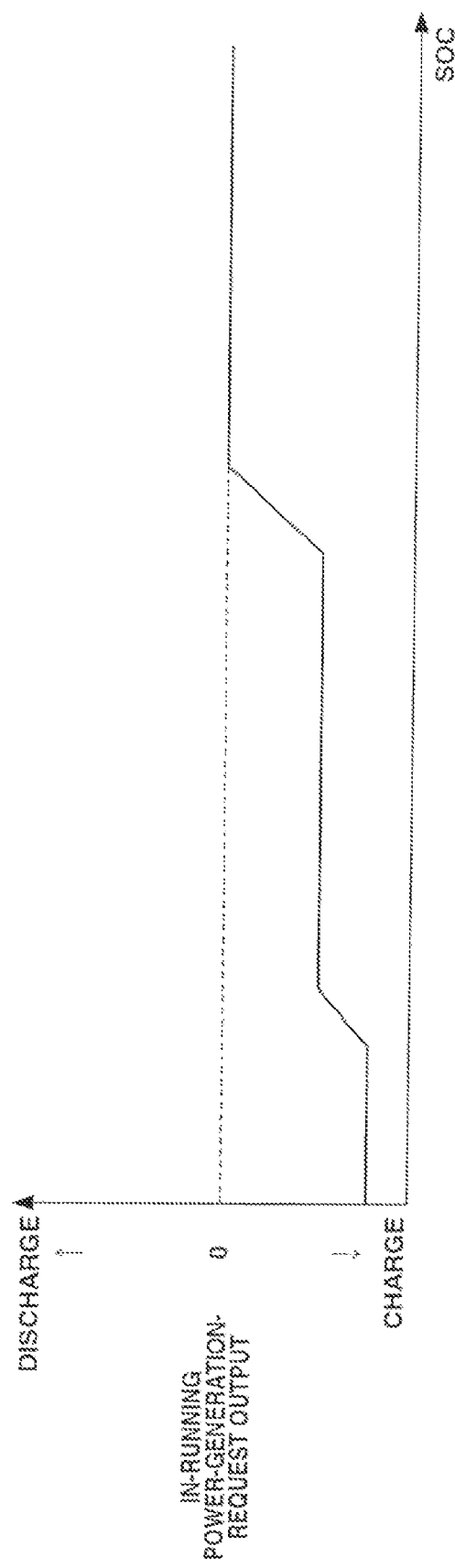
FIG. 6 A characteristic-line chart showing a target charge/discharge amount characteristic relative to a state of charge of a battery, in the drive-torque control device for hybrid vehicle in the first embodiment.
Figure 7:
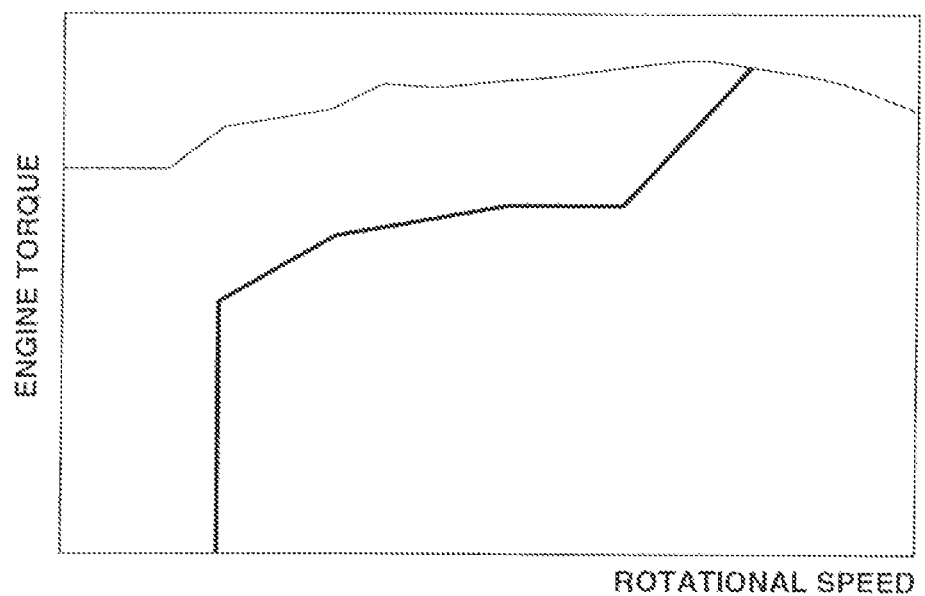
FIG. 7 An engine-torque-rise explanatory view showing that an engine torque rises up to a best fuel economy line according to a vehicle speed, in the drive-torque control device for hybrid vehicle in the first embodiment.

The target charge/discharge calculating section 300 calculates a target power-generation output based on the battery SOC, by using an in-running power-generation-request output map as shown in FIG. 6. Moreover, the target charge/ discharge calculating section 300 calculates an output necessary to increase an engine torque from a current operating point up to a best fuel economy line shown by a thick line of FIG. 7. Then, the target charge/discharge calculating section 300 compares this necessary output with the target power-generation output, and selects smaller one of these outputs as a request output, so that the selected smaller one is added to an engine output.

From the accelerator opening APO, the target drive torque tFo0, the MG assist torque, the target mode, the vehicle speed VSP and the target charge/discharge power (request power-generation output) tP, i.e., by regarding these values as an operating-point attainment target; the operating-point command section 400 calculates a transient target engine torque, a transient target MG torque, a transient target MG rotational speed, a transient target CL1 torque, a transient target CL2 torque and a transient target speed ratio. These calculation results are outputted through the CAN communication line 11 to the respective controllers 1, 2, 5 and 7.

Moreover, the operating-point command section 400 executes an engine start processing. That is, the mode selecting section 200 switches the running mode from the EV running mode to the HEV running mode accompanied by the engine start, when the driving point which is determined by the combination of the accelerator opening APO and the vehicle speed VSP enters a HEV region by exceeding an EV→HEV switchover line during the EV running. Furthermore, the mode selecting section 200 switches the running mode from the HEV running mode to the EV running mode accompanied by stop and separation of the engine, when the driving point enters an EV region by exceeding a HEV→EV switchover line during the HEV running.

In response to this mode switchover, the operating-point command section 400 executes the engine start processing at the time point when the accelerator opening APO rises through the engine start line shown in FIG. 5 during the EV running mode. In this start processing, torque capacity of the second clutch CL2 is controlled such that the second clutch CL2 is slipped in the partially-engaged (half-engaged) state, and then, the engine rotational speed is increased by starting to engage the first clutch CL1 after it is determined that the second clutch CL2 has started to slip. Then, when the engine rotational speed reaches a speed level capable of initial combustion, the engine Eng is actuated (activated). Then, when the motor rotational speed becomes close to the engine rotational speed, the first clutch CL1 is completely engaged, and then, the second clutch CL2 is locked up so that a transition to the HEV running mode is achieved.

A shift control section 500 drivingly controls solenoid valves installed in the automatic transmission AT so as to realize the target CL2 torque capacity and the target speed ratio.

FIG. 8 shows shift lines. That is, the shift control section 500 judges a next speed ratio from a current speed ratio on the basis of the vehicle speed VSP and the accelerator opening APO. If a shift request occurs, the shift control section 500 performs the shift by controlling shift clutches.

Figure 9:
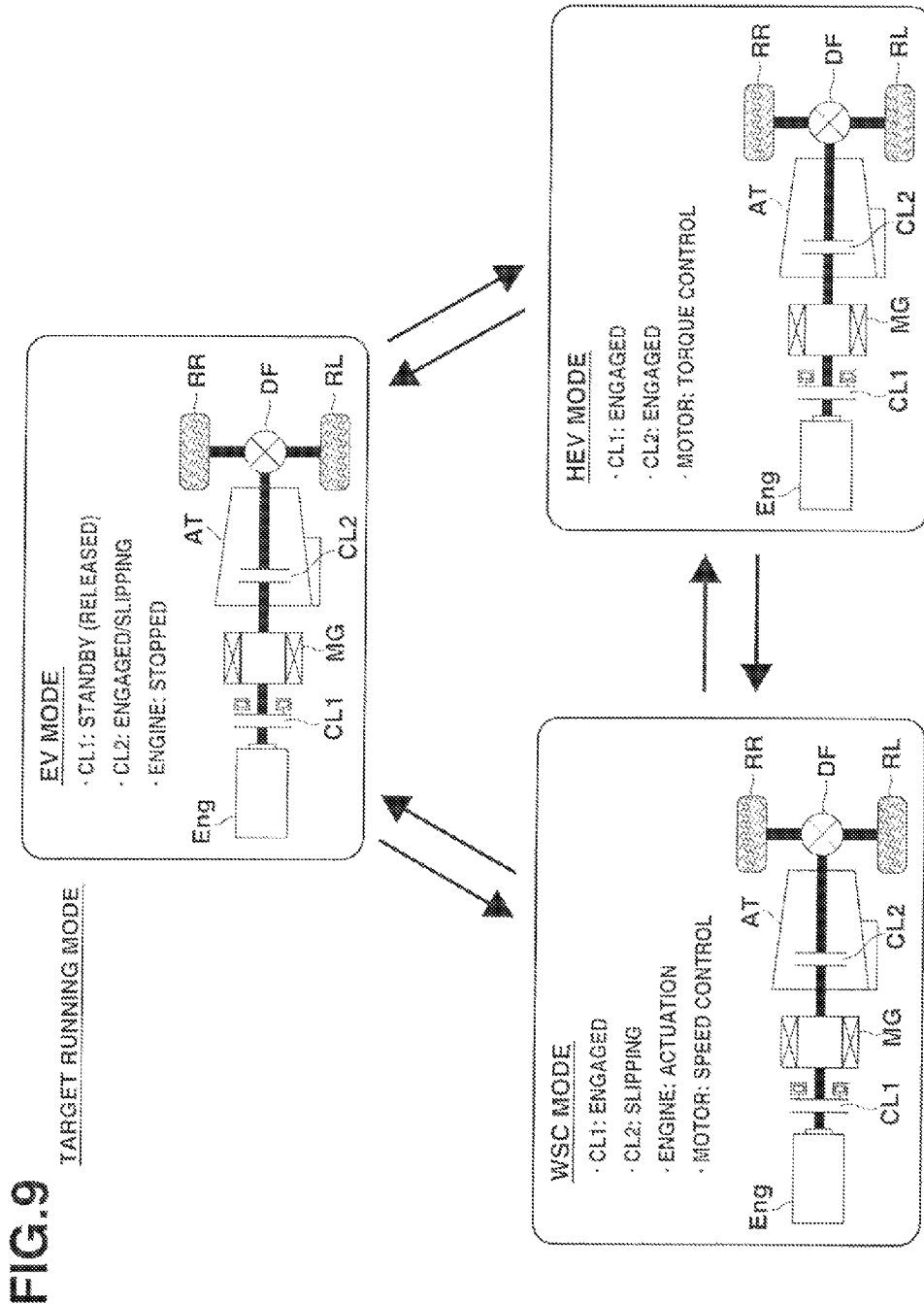
FIG. 9 A target running mode diagram showing one example of transition of a target running mode in the control device for hybrid vehicle in the first embodiment.

The integrated controller 10 constructed as above sets the EV mode, the HEV mode and a WSC mode as the running mode, as shown in FIG. 9. The WSC mode is realized during a switchover transition period between the EV mode and the HEV mode.

In the EV mode, the vehicle runs only by power of the motor/generator MG. In this EV mode, the engine Eng remains in a stopped state, the first clutch CL1 is in a released (disengaged) state, and the second clutch CL2 is in an engaged state or the slipping engaged state. Thereby, only the output rotation of the motor/generator MG is transferred through the automatic transmission AT to the left and right rear wheels RL and RR.

In the HEV mode, the vehicle runs by power of the engine Eng and the motor/generator MG. In this HEV mode, the second clutch CL2 and the first clutch CL1 are in the engaged state. Thereby, the output rotation of the engine Eng and the output rotation of the motor/generator MG are transferred through the automatic transmission AT to the left and right rear wheels RL and RR.

The WSC mode is realized when the vehicle stats to move with D-range selected from P-range and N-range in "HEV mode" or when the vehicle starts to move with D-range in "EV mode" or "HEV mode". At this time, the vehicle starts to move while controlling the clutch torque capacity. In this case, the vehicle starts to move while maintaining the slipping engaged state of the second clutch CL2 by way of rotational speed control of the motor/generator MG such that a clutch transfer torque passing through the second clutch CL2 is controlled to be brought close to a request drive torque determined according to a vehicle state and a driver's manipulation At this time, because the second clutch CL2 is in the slipping engaged state, a mode switchover shock is absorbed so that a countermeasure against the shock can be taken. It is noted that "WSC" stands for "Wet Start Clutch".

[Integrated-Control-Arithmetic-Processing Configuration]

Figure 10:
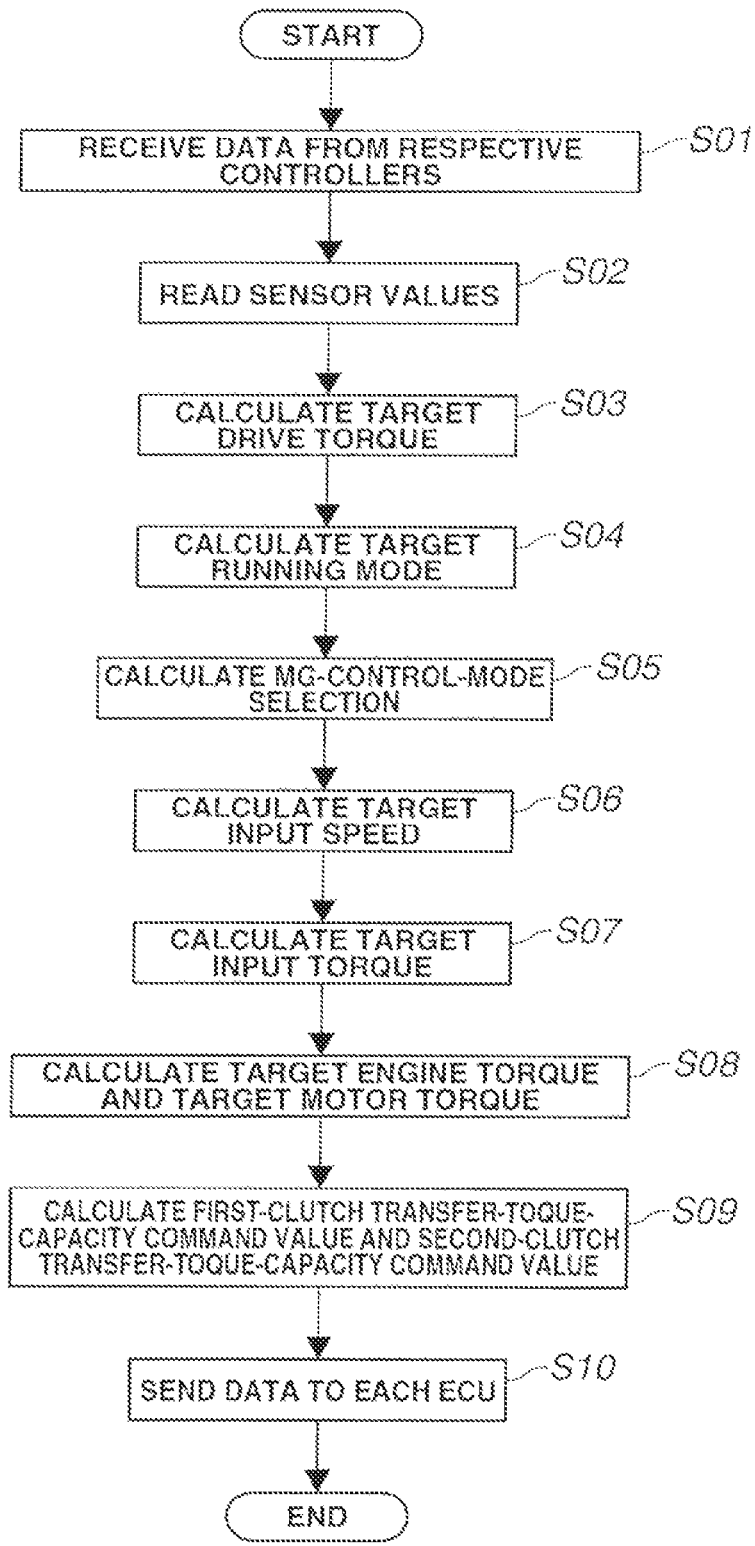
FIG. 10 A flowchart showing a flow of integrated-control arithmetic processing which is executed by the integrated controller 10 in the control device for hybrid vehicle in the first embodiment.

FIG. 10 shows a flow of an integrated-control arithmetic processing which is executed by the integrated controller 10. At step S01, the controller receives data from the respective controllers 1, 2, 5, 7 and 9. Then, the program proceeds to step S02. At step S02, the controller reads sensor values outputted from the respective sensors 12 and 15-22. Then, the program proceeds to step S03.

At step S03, the controller calculates the target drive torque tFo0 in accordance with the vehicle speed VSP, the accelerator opening APO and the brake braking force. Then, the program proceeds to step S04. At step S04, the controller calculates the target running mode from the target drive torque tFo0, the battery SOC, the accelerator opening APO, the vehicle speed VSP and a vehicle running condition (such as a gradient), with reference to the running-mode map of FIG. 3.

At step S05, the controller selects a control mode (a rotational-speed control or a torque control) of the motor/generator MG in accordance with the target running mode selected at step S04. The selected control mode is outputted to the motor controller 2, and then, the program proceeds to step S06.

At step S06, the controller calculates a target input rotational speed in accordance with the target running mode determined at step S04 and the control mode of the motor/generator MG calculated at step S05. Then, the program proceeds to step S07.

At step S07, the controller calculates a target input torque tTin in consideration of the target drive torque tFo0 and a protection of various kinds of devices. Then, the program proceeds to step S08.

At step S08, the controller determines a torque distribution between the engine Eng and the motor/generator MG and calculates target values thereof, in consideration of the power-generation request and the target input torque tTin calculated at step S07. Then, the program proceeds to step S09.

At step S09, the controller calculates a first-clutch transfer-torque-capacity command value tTcl1 and a second-clutch transfer-torque-capacity command value tTcl2. Then, the program proceeds to step S10.

At step S10, the integrated controller 10 sends data to the respective controllers 1, 2, 5, 7 and 9. The, the program proceeds to END.

[Engine-Start-Control-Section Configuration]

Figure 11:
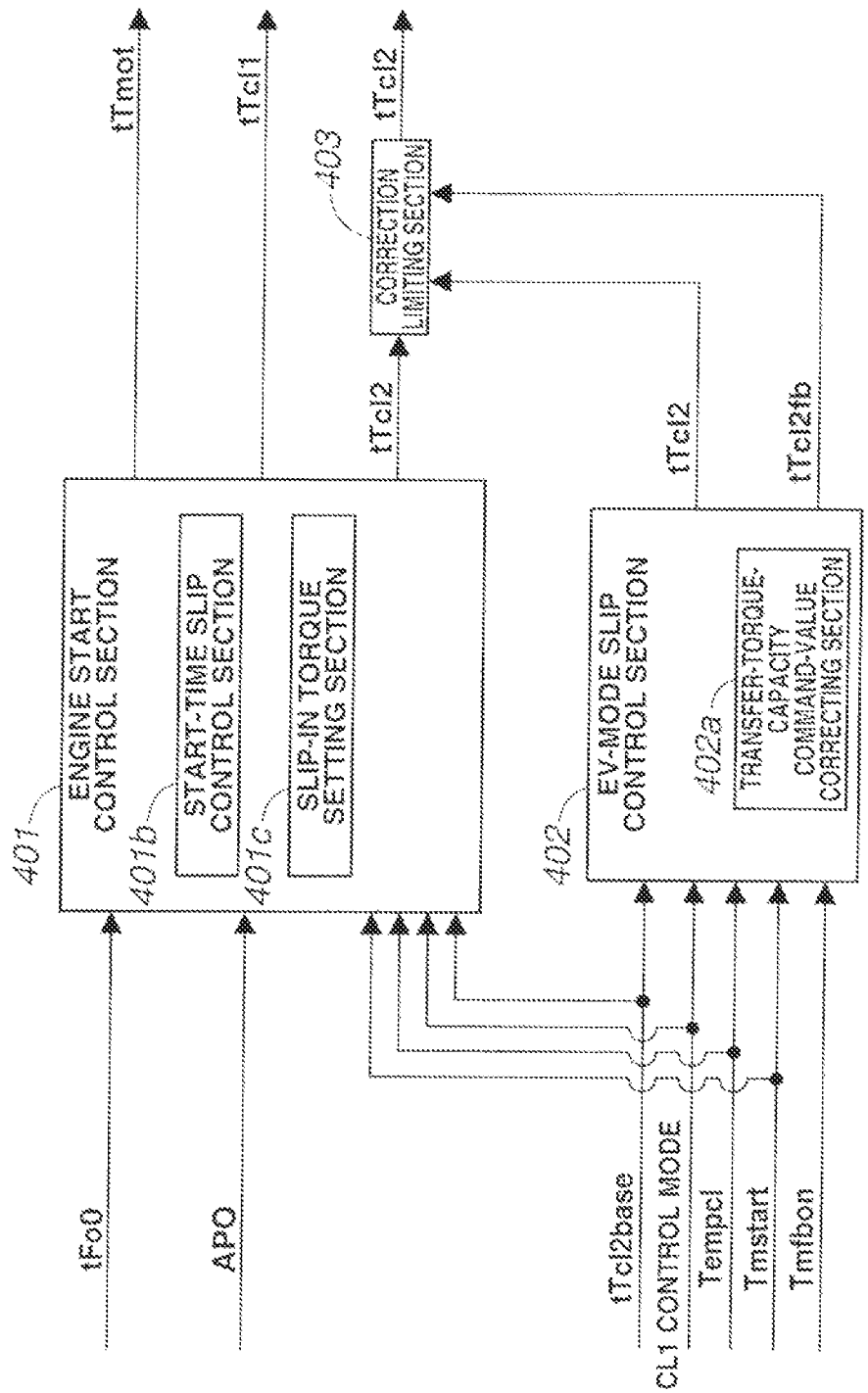
FIG. 11 A control block diagram showing a part for executing an engine start control and an EV-mode slip processing, in an operating-point command section of the integrated controller.

The operating-point command section 400 of the integrated controller 10 includes an engine start control section 401 and an EV-mode slip control section 402 as shown in FIG. 11.

At first, the engine start control section 401 will be explained.

Figure 13:
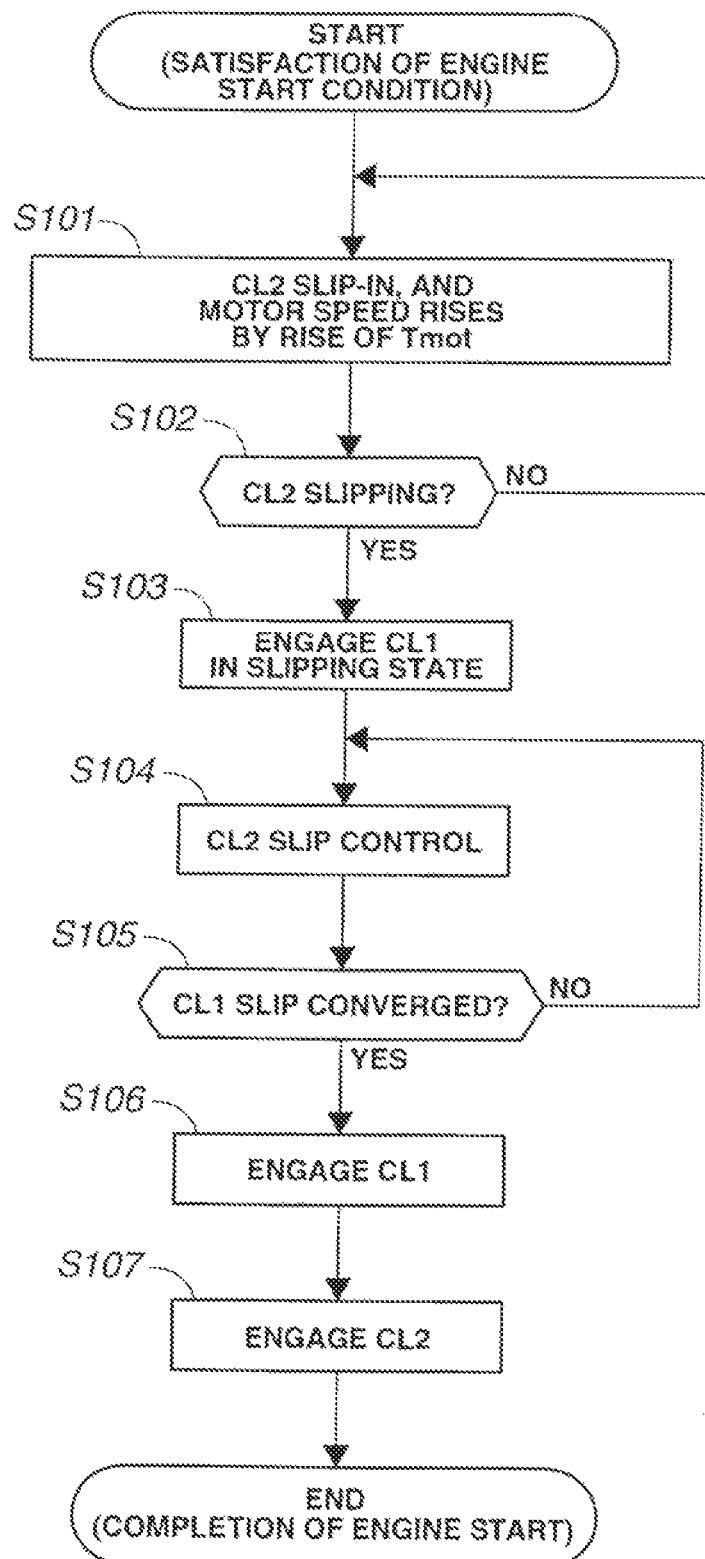
FIG. 13 A flowchart showing a process flow of the engine start control which is executed by an engine start control section included in the integrated controller.

The engine start control section 401 starts the engine Eng when the engine start is determined. A processing flow of this engine start control will now be briefly explained referring to a flowchart of FIG. 13.

As mentioned above, the engine start control is started when the accelerator opening APO or the vehicle speed VSP crosses over the engine start line (see FIG. 5).

At step S101, a slip-in processing in which the slip of the second clutch CL2 is started is executed. Moreover, a motor torque Tmot which is an output torque of the motor/generator MG is increased to increase the motor rotational speed Nmot. Then, the program proceeds to step S102.

It is noted that the slip-in processing is executed in order to reduce a second-clutch transfer torque capacity Tcl2 such that the second clutch CL2 slips.

Figure 16:
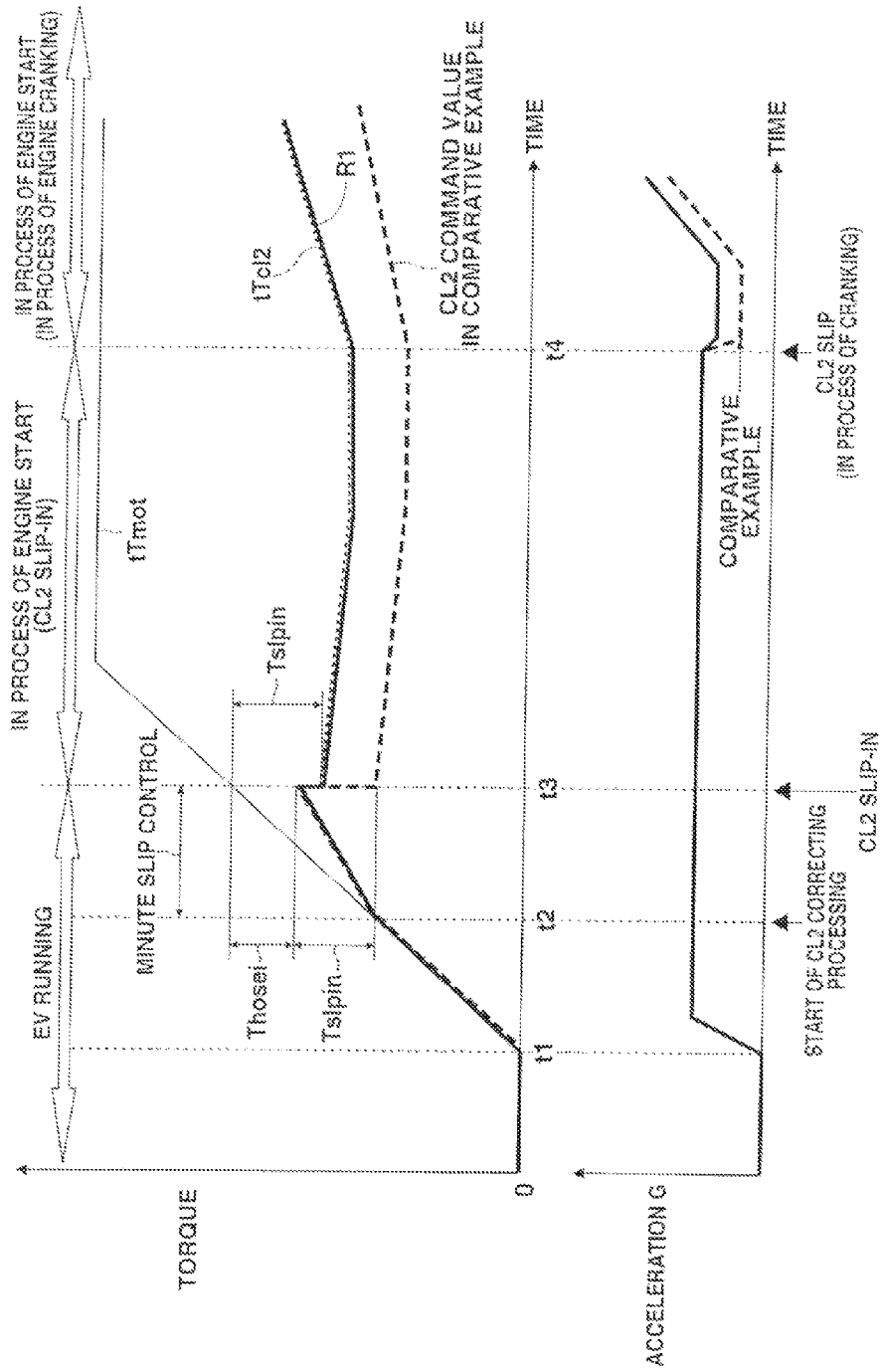
FIG. 16 A time chart showing action examples in the hybrid vehicle of the first embodiment and in a comparative example.

Specifically in the slip-in processing, as shown in FIG. 16, the second-clutch transfer-torque-capacity command value tTcl2 is reduced by a slip-in torque Tslpin from the target drive torque tFo0 obtained at the time of control start (corresponding to a motor torque command value tTmot obtained at the time of control start).

Figure 14:
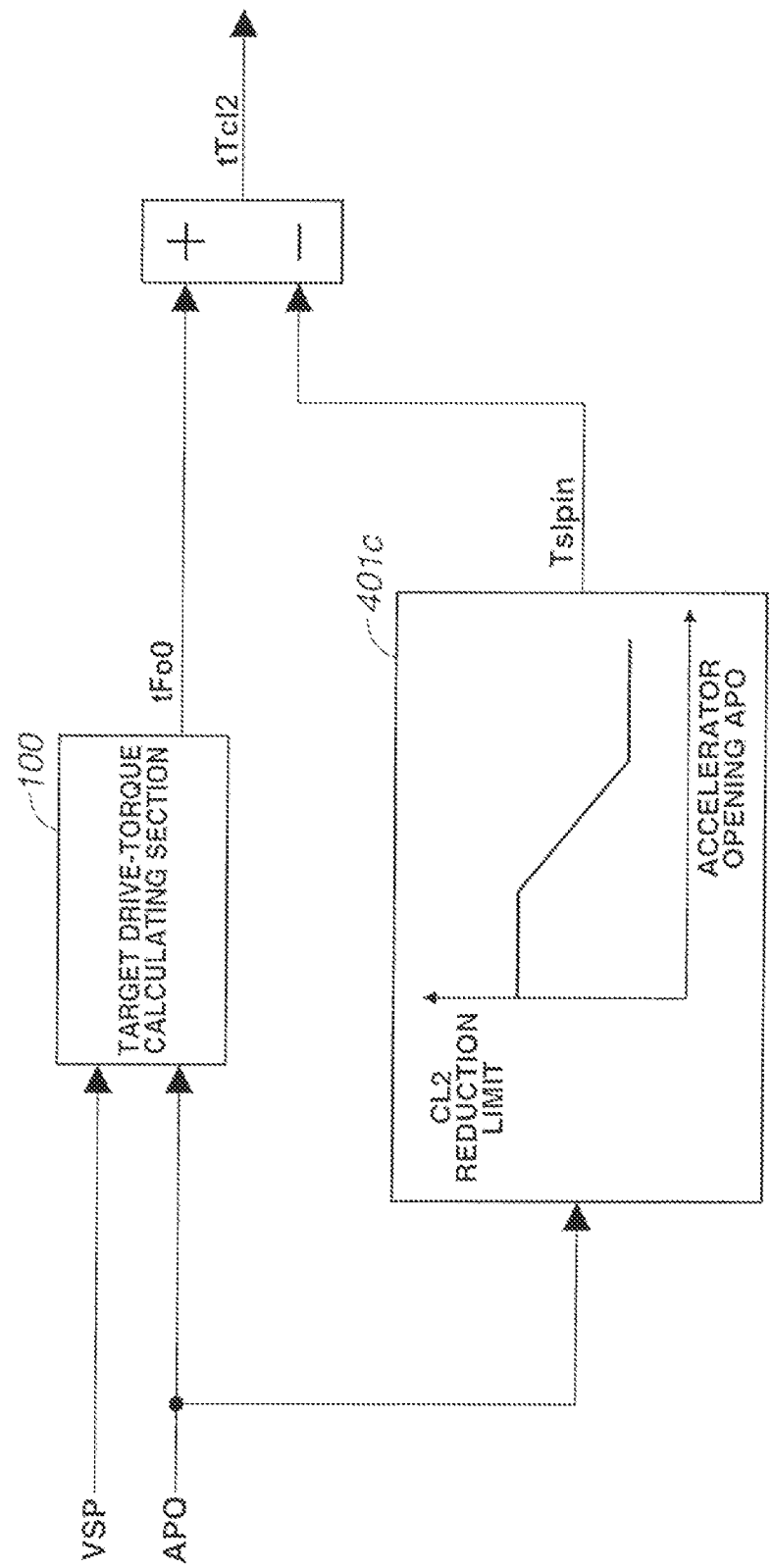
FIG. 14 A control block diagram showing a slip-in torque setting section and a slip-in torque setting map.

The slip-in torque Tslpin is a value set according to a level variability necessary to slip the second clutch CL2. As shown in FIG. 14, the slip-in torque Tslpin is set according to the accelerator opening APO, more specifically, is set at a larger value to generate the slipping more easily as the accelerator opening APO becomes smaller.

At step S102, a slip judgement for the second clutch CL2 is conducted. If the slip does not occur, the program turns back to step S101. If the slip has occurred, the program proceeds to step S103.

At step S103, the first clutch CL1 is made to become in the slipping engaged state, so that a rise of the motor rotational speed Nmot is inputted to the engine Eng. Thereby, the engine Eng is cranked up while accelerating the vehicle. Then, the program proceeds to step S104.

At step S104, the slip control for maintaining the second clutch CL2 in the slipping state is continued so as to suppress an acceleration change of the vehicle which is caused when an engine rotational speed Ne is increased by the engine cranking. Then, the program proceeds to step S105.

At step S105, a slip convergence judgement for the first clutch CL1 is conducted. If a convergence is determined because a slip amount has been reduced to a level indicating the drive of the engine Eng, the program proceeds to step S106. If the convergence is not determined, the program turns back to step S104.

At step S106 to which the program proceeds after a complete combustion of the engine Eng, the first clutch CL1 is fully engaged. At step S107, the second clutch CL2 is fully engaged. Then, the program proceeds to END so that the engine start control is finished.

[EV-Mode-Slip-Control-Section Configuration]

Again referring to FIG. 11, the EV-mode slip control section 402 executes a minute slip control. The minute slip control is a control for causing the second clutch CL2 to slip in a minute amount by controlling so as to maintain the state where an input-side rotational speed of the second clutch CL2 is slightly higher than an output-side rotational speed of the second clutch CL2 in the EV mode. By so doing, when the second clutch CL2 is reduced in torque by the after-mentioned slip-in torque Tclslin for the execution of the engine start control, a time necessary to decrease from a fully engaging hydraulic pressure can be shortened.

Moreover, the EV-mode slip control section 402 maintains the second-clutch transfer torque capacity Tcl2 at a value corresponding to the target drive torque tFo0, i.e. corresponding to a maximum drive torque at that time point, in order to generate the minute slip. The motor/generator MG controls torque such that the rotational speed of input shaft IN is slightly higher than the rotational speed of output shaft OUT.

Next, setting of a slip-amount target value ωcl2slp will now be explained. The slip-amount target value ωcl2slp is a target value of a slip amount in the EV-mode slip control section 402, or a target value of a slip amount which is controlled by a start-time slip control section 401b of the engine start control section 401.

The slip-amount target value ωcl2slp is calculated based on a first-clutch control mode, a second-clutch torque-capacity base target value tTcl2base, a clutch oil temperature Tempcl, and an engine start-time motor distribution torque Tmstart.

The first-clutch control mode represents the engaged state or the released state of the first clutch CL1. That is, the first clutch CL1 is released in the EV mode, and is engaged in the HEV mode and in an engine start mode.

According to the EV mode or the engine start mode, the slip-amount target value ωcl2slp is calculated by the following formula (1) or (2). That is, the slip-amount target value ωcl2slp in the EV mode represents a slip-amount target value under the minute slip control. Moreover, the slip-amount target value ωcl2slp in the engine start mode represents a slip-amount target value under the engine start control.

1) At Time of the EV Mode $$\omega cl2slp = fCCL2\_slpCL10P(tTcl2\_base, Tempcl) \quad (1)$$

Wherein the fCL2_slpCL10P is a function having input variables of the second-clutch torque-capacity base target value tTcl2base and the clutch oil temperature Tempcl. By a map of FIG. 12A, the slip-amount target value ωcl2slp is obtained. It is noted that, for example, the target drive torque tfo0 can be used as the second-clutch torque-capacity base target value tTcl2base.

Figure 12A:
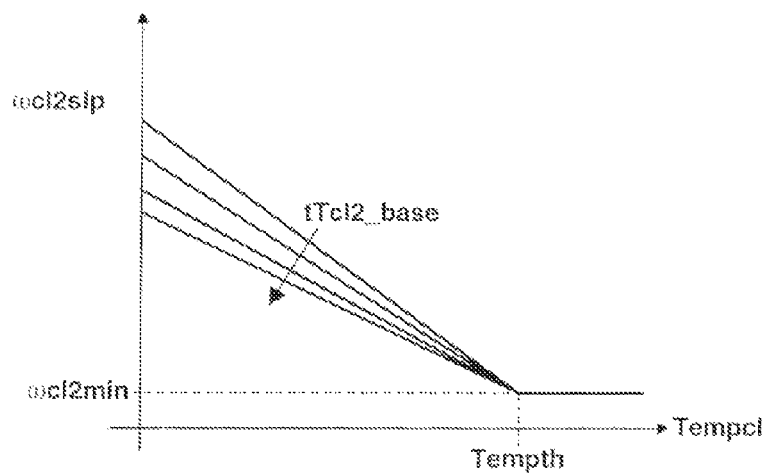
FIG. 12A A map of slip-amount target value which is used to calculate a slip-amount target value in the first embodiment.

As shown in FIG. 12A, the slip-amount target value ωcl2slp obtained when the clutch oil temperature Tempcl is equal to a threshold value Tempth is defined as a minimum slip amount ωcl2min. In a region where the clutch oil temperature Tempcl is lower than the threshold value Tempth, the slip-amount target value ωcl2slp is set at a smaller value as the clutch oil temperature Tempcl becomes higher. Moreover, in a region where the clutch oil temperature Tempcl is higher than the threshold value Tempth, the slip-amount target value ωcl2slp is set at the minimum slip amount ωcl2min regardless of the clutch oil temperature Tempcl. Moreover, in the region where the clutch oil temperature Tempcl is lower than the threshold value Tempth, the slip-amount target value ωcl2slp is set at a larger value as the second-clutch torque-capacity base target value tTcl2base becomes larger.

Accordingly, the slip-amount target value ωcl2slp is set as a small value when the clutch oil temperature Tempcl is high and/or when the second-clutch torque-capacity base target value tTcl2base is large. Hence, a rise of the clutch oil temperature is suppressed.

2) In Case of the Engine Start Mode $$\omega cl2slp = fCL2_{13}\_slpCL10P(tTcl2\_base, Tempcl) + f\Delta\omega cl2slp(Tmstart) \quad (2)$$

Wherein the fΔωcl2slp is a function having an input variable of the engine start-time motor distribution torque Tmstart. By a map of FIG. 12B, a slip increment target value Δωcl2slp which is necessary to start the engine Eng is obtained.

Figure 12B:
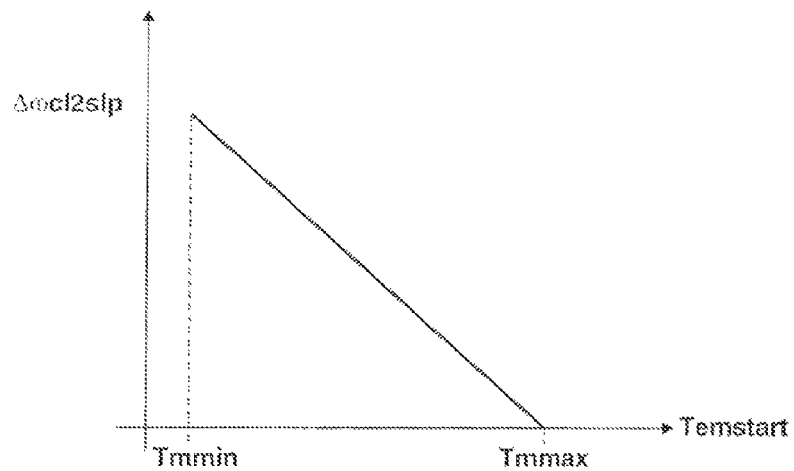
FIG. 12B A map of slip-increment target value which is used to calculate a slip-increment target value necessary to start the engine in the first embodiment.

That is, as shown in FIG. 12B, the slip increment target value Δωcl2slp is set at a smaller value as the engine start-time motor distribution torque Tmstart becomes larger, in a region between a slip-increment-target-value minimum motor torque Tmmin and a slip-increment-target-value maximum motor torque Tmmax.

Accordingly, the second clutch CL2 is prevented from being rapidly fully-engaged even if the rotational speed of the input shaft IN is reduced due to a disturbance inputted from the first clutch CL1 when the first clutch CL1 is in the engaged state. Hence, the engine Eng can be started without generating an acceleration fluctuation.

It is noted that the above-mentioned "fully engaged" means a state where the rotational speed of the input shaft IN of the second clutch CL2 becomes approximately equal to the rotational speed of the output shaft OUT of the second clutch CL2. Hereinafter, the "fully engaged" is also simply expressed by "engaged" in contrast with "slipping state".

When the minute slip control is executed, the rotational speed of the input shaft IN of the second clutch CL2 is controlled by the motor/generator MG as mentioned above.

In this control, a transfer-torque-capacity command-value correcting section 402a conducts a feedback correction for the second-clutch transfer-torque-capacity command value tTcl2. Specifically, the transfer-torque-capacity command-value correcting section 402a calculates a correction amount Thosei based on a difference between a rotational-speed-control motor-torque target value Tmfbon of the motor/generator MG and the second-clutch torque-capacity base target value tTcl2base. That is, the correction amount Thosei is calculated so as to eliminate this difference. It is noted that details about the calculation of the correction amount Thosei by the transfer-torque-capacity command-value correcting section 402a are disclosed in the Patent literature 1, and therefore are omitted.

[Correction-Limiting-Section Configuration]

Next, a correction limiting section 403 will be explained.

Figure 15:
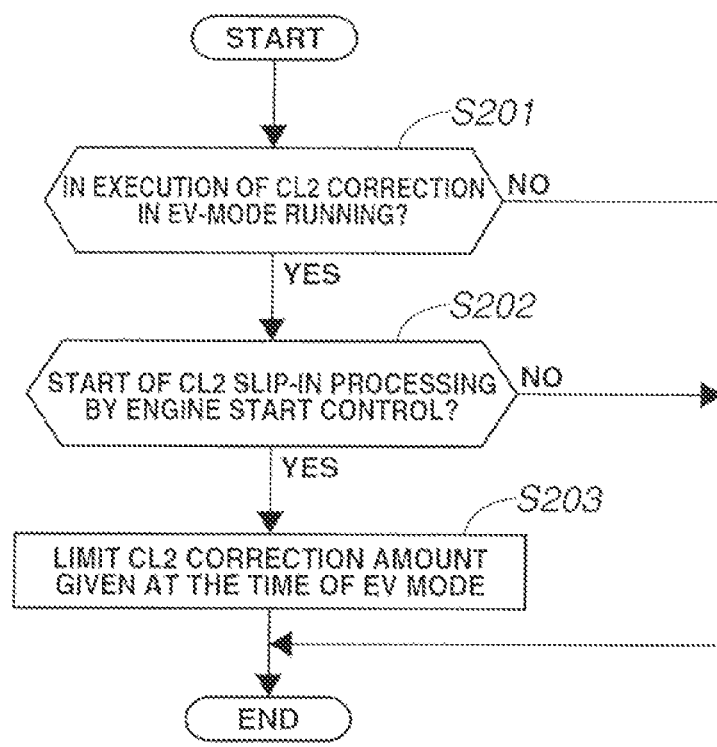
FIG. 15 A flowchart showing a flow of correction limiting processing of a correction limiting section in the first embodiment.

The correction limiting section 403 functions to limit the correction amount of the transfer-torque-capacity command-value correcting section 402a at the time of slip-in processing of step S101. A process flow will now be explained referring to a flowchart of FIG. 15.

At step S201, it is judged whether or not the transfer-torque-capacity command-value correcting section 402a is executing the correcting processing (the correction for the second clutch CL2) at the time of the EV-mode running. If the transfer-torque-capacity command-value correcting section 402a is executing the correcting processing, the program proceeds to step S202. If the transfer-torque-capacity command-value correcting section 402a is not executing the correcting processing, a current routine is terminated without executing a correction limiting processing.

At step S202, it is judged whether or not the slip-in processing of the second clutch CL2 has been started by the engine start control. If the slip-in processing has been started, the program proceeds to step S203. If the slip-in processing is not started, the program proceeds to END without executing the correction limiting processing.

At step S203, the transfer-torque-capacity command-value correcting section 402a limits the correction amount during the EV mode. Then, the program proceeds to END. As the processing for limiting the correction amount, the correction amount Thosei is reduced to zero in the first embodiment. However, for example, a predetermined amount may be subtracted from the correction amount Thosei, or alternatively, the correction amount Thosei may be multiplied by a coefficient smaller than 1. That is, according to the present invention, the correction amount Thosei has only to be lightened.

As mentioned above, in the case that the reduction of the slip-in torque Tslpin by the slip-in processing occurs with (interferes with) the reduction of the correction amount Thosei by the correcting processing, the correction limiting section 403 limits the reduction of the correction amount Thosei to a zero level.

Moreover, as mentioned above, the correction limiting section 403 sets the correction amount Thosei at "0" in the case that the correction amount Thosei has occurred at the start time of the slip-in processing. That is, an execution condition of the correction limiting processing includes a situation where the engine start control is started with the correction amount Thosei maintained although the minute slip processing has been suspended.

Moreover, in the first embodiment, the correction amount Thosei may be a reduction amount which is used in middle of reducing the second-clutch transfer torque capacity Tcl2 for shift to the minute slip processing, just before the start of the engine start processing. That is, the execution condition of the correction limiting processing includes a situation where the second-clutch transfer torque capacity Tcl2 is in middle of being reduced for the transition to the minute slip processing just before the start of the engine start processing although the minute slip control has not yet been executed before the start of the engine start processing.

Operations in First Embodiment

Next, operations in the first embodiment will now be explained based on an action example shown by a time chart of FIG. 16.

This action example shows a case that the vehicle starts to move somewhat suddenly from a stopped state of the vehicle. That is, the vehicle starts to move in the EV mode at time point t1 because a driver depresses an accelerator pedal (not shown). At time point t3, the engine start control is started because the engine start determination is conducted.

In this action example, the minute slip control is started at time point t2. Moreover, the transfer-torque-capacity command-value correcting section 402a executes the correcting processing in connection with the minute slip control.

Problem to be Solved in Comparative Example

Before explaining the action example in the first embodiment according to present invention in detail, an action example in a comparative example and its problems will now be explained.

FIG. 16 shows the case that the minute slip control is carried out and the transfer-torque-capacity command-value correcting section 402a corrects torque in a torque-reducing direction by the correction amount Thosei, at the time of the EV-mode running before the engine start is determined. From this state, the slip-in torque Tslpin is calculated when the engine start control section carries out the slip-in control by the engine start determination. Then, a value obtained by subtracting the slip-in torque Tslpin from the second-clutch transfer-torque-capacity command value tTcl2 at that moment is set as the second-clutch transfer-torque-capacity command value tTcl2 for the slip-in processing.

That is, as shown by a dotted line of FIG. 16, the second-clutch transfer-torque-capacity command value tTcl2 at slip-in time (t3) is a value obtained by subtracting the slip-in torque Tslpin and the correction amount Thosei from the motor torque command value tTmot. Hence, there has been a problem that the second-clutch transfer torque capacity Tcl2 (the second-clutch transfer-torque-capacity command value tTcl2) is excessively reduced so that a vehicle acceleration G is lowered.

After the slip-in at time point t3, a slip is caused in the second clutch CL2. Then, the first clutch CL1 is brought into the slipping engaged state, and transfer torque amount is increased at an increase gradient R1 to control the slip amount of the second clutch CL2 (at time point t4).

In the case that such processing is performed, the second-clutch transfer torque capacity Tcl2 is excessively reduced at the slip-in time t3, and thereby, the second-clutch transfer torque capacity Tcl2 produced at a cranking-start time point t4 is relatively low so that a sufficient drive torque is not transferred to the drive wheels.

Therefore, as shown by the dotted line in Figure, there has been a problem that the vehicle acceleration G is lowered to cause an insufficient-progress feeling in acceleration (vehicle speed-up).

Comparison Between Comparative Example and First Embodiment

Contrarily, in the first embodiment according to the present invention, the correction limiting section 403 limits the correction amount Thosei given by the correcting processing, to 0 (S201→S202→S203) at the start time of the slip-in processing.

Therefore, in the first embodiment, as shown in the time chart of FIG. 16, the second-clutch transfer-torque-capacity command value tTcl2 at the slip-in time point t3 is a value obtained by subtracting the slip-in torque Tslpin from an imaginary magnitude of the second-clutch transfer-torque-capacity command value tTcl2 uninfluenced by the correction amount Thosei. That is, the slip-in torque Tslpin is not subtracted from the second-clutch transfer-torque-capacity command value tTcl2 given at the slip-in time, but is subtracted from the motor torque command value tTmot corresponding to the second-clutch transfer-torque-capacity command value tTcl2 uninfluenced by the correcting processing.

Accordingly, when the cranking starts (t4), the second-clutch transfer torque capacity (command value tTcl2) corresponding to a drive torque which is transferred toward the drive wheels is higher than that of the comparative example shown by the dotted line in Figure. Hence, the vehicle acceleration G is higher than that of the comparative example shown by the dotted line in Figure. Therefore, the insufficient-progress feeling in vehicle speed-up can be eased.

Effects in First Embodiment

Effects according to the first embodiment will be listed below.

a) The hybrid vehicle control device in the first embodiment includes:

the engine Eng and the motor/generator MG provided as drive sources of a vehicle;

the second clutch CL2 provided in a drive transfer system from the drive sources (Eng, MG) to the drive wheels (left and right rear wheels) and configured to vary transfer torque therebetween as a drive-wheel-side clutch;

the EV-mode slip control section 402 configured to execute the minute slip processing such that the minute slip of the second clutch CL2 is generated during the EV mode where only drive force of the motor/generator MG is used as drive force of the vehicle, the EV-mode slip control section 402 including the transfer-torque-capacity command-value correcting section 402a configured to execute the correcting processing such that the transfer-torque-capacity command value tTcl2 for the second clutch CL2 is corrected according to the difference between the transfer torque capacity of the second clutch CL2 and the target value of the minute slip processing if the difference exists at the time of execution of the minute slip processing;

the engine start control section 401 configured to execute the engine start control such that the engine Eng is started by slipping the second clutch CL2 and increasing drive torque of the motor/generator MG when the start of the engine Eng is determined, the engine start control section 401 including the start-time slip control section 401b configured to execute the slip-in processing such that the transfer torque capacity of the second clutch CL2 is controlled to the slip-in torque Tslpin which is predetermined in order to slip the second clutch CL2; and the correction limiting section 403 configured to execute the correction limiting processing such that the reduction amount of the transfer-torque-capacity command value given by the transfer-torque-capacity command-value correcting section 402a is limited under the condition that the reduction of slip-in torque given by the slip-in processing occurs with the reduction of correction amount given by the correcting processing.

The correction limiting section 403 limits the reduction amount of the transfer-torque-capacity command value given by the transfer-torque-capacity command-value correcting section 402a when the start-Time slip control section 401b executes the slip-in processing in order to cause the second clutch CL2 to slip in the engine start control.

Hence, the second clutch CL2 can be reliably made to slip while suppressing the torque reduction amount, as compared with the case that the second-clutch transfer-torque-capacity command value tTcl2 is reduced by the sum of the slip-in torque Tslpin and the correction amount Thosei at the time of slip-in.

Therefore, the lowering of vehicle acceleration is suppressed during the engine start, so that a feeling of acceleration missing can be inhibited from occurring.

b) In the hybrid vehicle control device in the first embodiment, the correction limiting section 403 is configured to limit the correction amount Thosei to zero when the correction limiting processing is in execution.

Accordingly, even if the transfer-torque-capacity command-value correcting section 402*a* is executing the correcting processing, a reduction amount of the second-clutch transfer-torque-capacity command value tTcl2 relative to the motor torque command value tTmot at the time of slip-in is merely equal to the slip-in torque Tslpin, in the same manner as when the correcting processing is not in execution.

Therefore, the slipping state of the second clutch CL2 can be maintained at a constant level regardless of execution or non-execution of the correcting processing by the transfer-torque-capacity command-value correcting section 402*a*. Hence, at the time of engine start, the vehicle acceleration is inhibited from being lowered by the execution of the correcting processing, so that the feeling of acceleration missing can be inhibited from occurring.

c) In the hybrid vehicle control device in the first embodiment, the condition for the correction limiting section 403 to execute the correction limiting processing includes a situation where the engine start control is started with the correction amount Thosei maintained although the minute slip processing has been suspended.

When the minute slip control is in execution during the EV-mode running, the second clutch CL2 is already in the slipping state. At this time, for the engine start, the second-clutch transfer torque capacity Tcl2 does not need to be further reduced by the slip-in torque Tslpin, from a state just before the slip-in.

On the other hand, when the minute slip control is not in execution, the second-clutch transfer torque capacity Tcl2 needs to be reduced by the slip-in torque Tslpin by way of the slip-in processing.

If it is judged whether or not the correction limiting processing should be executed on the basis of execution or non-execution of the minute slip control when the correction amount Thosei is still held although the minute slip control has been suspended, there is a risk that the correction amount Thosei is added to the subtraction value by which the second-clutch transfer torque capacity is reduced at the execution time of the slip-in processing. In this case, as mentioned above, the vehicle acceleration excessively decreases to cause the feeling of acceleration missing.

In this embodiment, the above effects of item a) are achieved because the correction limiting section 403 limits the correction amount Thosei at the time of slip-in processing.

d) In the hybrid vehicle control device in the first embodiment, the condition for the correction limiting section 403 to execute the correction limiting processing includes a situation where the transfer torque capacity of the second clutch CL2 is in middle of being reduced for a transition to the minute slip processing just before the start of the engine start processing although the minute slip control has not yet been executed before the start of the engine start processing.

Accordingly, the above effects of item a) can be achieved even in the case where the transfer torque capacity of the second clutch CL2 is in middle of being reduced for a transition to the minute slip processing immediately before the start of the engine start processing although the minute slip control has not yet been executed before the start of the engine start processing.

e) In the hybrid vehicle control device in the first embodiment, the start-time slip control section 401*b* includes the slip-in torque setting section 401*c* configured to set the slip-in torque Tslpin based on a reduction-amount characteristic (shown in FIG. 14) of drive torque according to the accelerator opening APO given as a manipulated amount of the accelerator.

Accordingly, the vehicle acceleration at the time of engine start can be inhibited from deviating from an acceleration level expected by a driver, because the reduction amount of the second-clutch transfer-torque-capacity command value tTcl2 at the time of slip-in is determined according to the accelerator-manipulated amount indicated at the time of engine start.

f) In the hybrid vehicle control device in the first embodiment, the first clutch CL1 is provided as a starting clutch interposed between the engine Eng and the motor/generator MG and configured to vary transfer torque therebetween; the engine start control section 401 is configured to slip the second clutch CL2, to increase the drive torque of the motor/generator MG, and to engage the first clutch CL1 in a slipping state when the start of the engine Eng is determined; and the engine start control section 401 is configured to fully engage both of the clutches CL1 and CL2 after drive of the engine Eng is started.

Accordingly, the above effects of items a) to e) can be achieved in a hybrid vehicle equipped with the engine Eng, the motor/generator MG, the first clutch CL1 and the second clutch CL2.

Although the hybrid vehicle control device according to the present invention has been explained above with reference to certain embodiments, concrete configurations are not limited to the embodiments described above. Design modifications, additions and the like to the embodiments will occur within scopes according to respective claims.

For example, in the above embodiment, the first clutch CL1 is provided between the engine and the motor, as the starting clutch. However, the configuration according to the present invention is not limited to this. The hybrid vehicle control device according to the present invention is also applicable to a vehicle in which the engine is directly connected to the motor without providing the starting clutch.

Moreover, in the above embodiment, the rear-wheel-drive vehicle is shown in Figures as the hybrid vehicle. However, the hybrid vehicle control device according to the present invention is also applicable to a front-wheel-drive vehicle and a four-wheel-drive vehicle.

Moreover, in the above embodiment, the limiting section limits the correction amount to 0. However, according to the present invention, the correction amount does not necessarily need to be reduced down to 0, but has only to be reduced. That is, by reducing the correction amount which is added to the slip-in torque, the above-mentioned effect in item a) can be achieved as compared with the case that torque is reduced by the sum of the correction amount and the slip-in torque.

Moreover, in the above embodiment, the slip-in torque is set according to the accelerator opening. However, the configuration according to the present invention is not limited to this. For example, the slip-in torque may be set according to a degree of accelerator manipulation of a driver. In this case, an accelerator-pedal depressed amount, an absolute value of the target drive torque or a change amount thereof can be used instead of the accelerator opening. Alternatively, according to the present invention, the slip-in torque may be a constant value.

CROSS REFERENCE TO RELATED APPLICATIONS

This application is based on a prior Japanese Patent Application No. 2012-281901 filed on Dec. 26, 2012 with Japan Patent Office. The entire contents of this Japanese Patent Application are hereby incorporated by reference.

What is claimed is:

1. A hybrid vehicle control device comprising:
an engine and a motor provided as drive sources of a vehicle:
a drive-wheel-side clutch provided in a drive transfer system from the drive sources to a drive wheel and configured to vary a transfer torque between the drive sources to the drive wheel;
an EV-mode slip control section configured to execute a minute slip processing such that a minute slip of the drive-wheel-side clutch is generated in an EV mode where only a drive force of the motor is used as a drive force of the vehicle, the EV-mode slip control section including
a transfer-torque-capacity command-value correcting section configured to execute a correcting processing such that a transfer-torque-capacity command value for the drive-wheel-side clutch is corrected according to a difference between a transfer torque capacity of the drive-wheel-side clutch and a target value of the minute slip processing if the difference exists at the time of execution of the minute slip processing;
an engine start control section configured to execute an engine start control such that the engine is started by slipping the drive-wheel-side clutch and increasing a drive torque of the motor when a start of the engine is determined, the engine start control section including
a start-time slip control section configured to execute a slip-in processing such that the transfer torque capacity of the drive-wheel-side clutch is reduced by a slip-in torque when the engine start control is started, the slip-in torque being predetermined in order to slip the drive-wheel-side clutch; and
a correction limiting section configured to execute a correction limiting processing such that a reduction amount given by the correcting processing is limited under a condition that a reduction of the slip-in torque given by the slip-in processing occurs with a reduction of correction amount given by the correcting processing.

2. The hybrid vehicle control device according to claim 1, wherein
the correction limiting section is configured to limit the correction amount to zero when the correction limiting processing is in execution.

3. The hybrid vehicle control device according to claim 1, wherein
the condition for the correction limiting section to execute the correction limiting processing includes a situation where the engine start control is started with the correction amount maintained although the minute slip processing has been suspended.

4. The hybrid vehicle control device according to claim 1, wherein
the condition for the correction limiting section to execute the correction limiting processing includes a situation where the transfer torque capacity of the drive-wheel-side clutch is in middle of being reduced for a transition to the minute slip processing just before a start of the engine start control although the minute slip processing has not yet been executed before the start of the engine start control.

5. The hybrid vehicle control device according to claim 1, wherein
the start-time slip control section includes a slip-in torque setting section configured to set the slip-in torque based on a reduction-amount characteristic of drive torque according to a manipulated amount of an accelerator.

6. The hybrid vehicle control device according to claim 1, wherein
the hybrid vehicle control device further comprises a starting clutch provided between the engine and the motor and configured to vary a transfer torque between the engine and the motor,
the engine start control section is configured to slip the drive-wheel-side clutch, to increase the drive torque of the motor, and to produce a slipping engagement of the starting clutch when the start of the engine is determined, and
the engine start control section is configured to fully engage both of the starting clutch and the drive-wheel-side clutch after a drive of the engine is started.

* * * * *